United States Patent [19]
Ansberry et al.

[11] Patent Number: 5,557,725
[45] Date of Patent: Sep. 17, 1996

[54] METHOD AND SYSTEM FOR SWITCHING BETWEEN USERS IN A CONFERENCE ENABLED APPLICATION

[75] Inventors: Catherine M. Ansberry, Redmond; Jay D. Freer, Bellevue; Todd W. Fuqua; Erik P. Mesterton, both of Redmond, all of Wash.; Catherine A. Stillwagon, Saddle River, N.J.; Ching-Yun Yang, Austin, Tex.

[73] Assignee: International Business Machines Corporation, Armonk, N.Y.

[21] Appl. No.: 387,500

[22] Filed: Feb. 13, 1995

[51] Int. Cl.$^6$ .................................................. G06F 15/177
[52] U.S. Cl. ..................... 395/153; 395/200.04; 379/202
[58] Field of Search ................................. 395/153, 154, 395/161, 200.04; 434/307 R, 322–323, 430–431; 379/202, 203, 204, 205; 345/1–3; 370/62

[56] References Cited

U.S. PATENT DOCUMENTS

| | | | |
|---|---|---|---|
| 4,129,859 | 12/1978 | Iwamura et al. | 345/123 |
| 4,400,724 | 8/1983 | Fields | 358/85 |
| 4,442,495 | 4/1984 | Sukonick | 345/24 |
| 4,533,910 | 8/1985 | Sukonick et al. | 345/118 |
| 4,642,790 | 2/1987 | Minshull et al. | 345/158 |
| 4,736,407 | 4/1988 | Dumas | 379/96 |
| 4,796,201 | 1/1989 | Wake | 395/130 |
| 4,831,556 | 5/1989 | Oono | 395/157 |
| 4,845,644 | 7/1989 | Anthias et al. | 395/157 |
| 4,860,217 | 8/1989 | Sasaki et al. | 395/125 |
| 4,893,326 | 1/1990 | Duran et al. | 348/17 |
| 4,937,856 | 6/1990 | Natarajan | 379/158 |
| 4,939,509 | 7/1990 | Bartholomew et al. | 345/2 |
| 4,953,159 | 8/1990 | Hayden et al. | 370/62 |
| 4,974,173 | 11/1990 | Stefik et al. | 395/153 |
| 4,987,492 | 1/1991 | Stults et al. | 358/181 |
| 5,062,040 | 10/1991 | Bishop et al. | 395/650 |
| 5,065,347 | 11/1991 | Pajak et al. | 395/159 |
| 5,119,319 | 6/1992 | Tanenbaum | 364/514 A |
| 5,148,154 | 9/1992 | MacKay et al. | 345/119 |
| 5,148,521 | 9/1992 | Ebbers et al. | 395/155 |
| 5,175,854 | 12/1992 | Cheung et al. | 395/650 |
| 5,179,652 | 1/1993 | Rozmanith et al. | 395/155 |
| 5,191,644 | 3/1993 | Takeda | 395/158 |
| 5,195,086 | 3/1993 | Baumgartner et al. | 370/62 |
| 5,214,784 | 5/1993 | Ward et al. | 395/800 |
| 5,241,625 | 8/1993 | Epard et al. | 395/163 |
| 5,257,306 | 10/1993 | Watanabe | 379/53 |
| 5,280,583 | 1/1994 | Nakayama et al. | 395/200.04 |
| 5,289,574 | 2/1994 | Sawyer | 395/157 |
| 5,293,619 | 3/1994 | Dean | 395/650 |
| 5,315,633 | 5/1994 | Champa | 348/16 |
| 5,347,306 | 9/1994 | Nitta | 348/15 |

OTHER PUBLICATIONS

Sakata, "B–ISDN Multimedia Workstation Architecture", IEEE Communication Magazine, Aug. 1993, vol. 31, No. 8, pp. 64–67.

Heinrichs et al, "EuroBridge: communications services for multimedia applications", *Electronics and Communications Engineering Journal*, Feb. 1993, vol. 5, No. 1, pp. 45–50.

Cochrane et al, "Telepresence—Visual Telecommunications into the Next Century", Telecommunicaitons, 1993, (IEE Conf. Pub. 371), pp. 175–180.

(List continued on next page.)

*Primary Examiner*—Mark K. Zimmerman
*Assistant Examiner*—Joseph H. Feild
*Attorney, Agent, or Firm*—Ingrid M. Foerster; Keith L. Hargrove; Andrew J. Dillon

[57] ABSTRACT

A method of selecting which user has the input focus, and conditions by which a different user will get the input focus in the future. A user is said to have the 'floor' if that user is enabled to become the input focus, or in other words, to provide input to the shared application. Zero or more users may have the floor at a particular time. (This is in contrast to a human conference or meeting where generally one person has the floor at a time). A method of selecting the set of users who have the floor is called a floor control policy. The floor control policy determines the set of participants who have the floor now, who will get the floor next, and how and when the floor assignments are made.

6 Claims, 3 Drawing Sheets

OTHER PUBLICATIONS

Kobayashi et al, ("Virtual Conference Room: A Metaphor for Multi–User Real–Time Conferencing Systems", *Robot and Human Communication, 1993, Int'l. Workshop,* Jul. 1993, pp. 430–435).

Vonderweigt et al, "A Multipoint Communication Service for Interactive Applications", *IEEE Transaction on Communications,* Dec. 1991, vol. 39, No. 12, pp. 1175–1885.

Robinson et al, "A Multimedia Interactive Conferencing Application for Personal Workstations", *IEEE Transaction on Communications,* Nov. 1991, vol. 39, No. 11, pp. 1698–1708.

D. M. Chess et al., IBM Technical Disclosure Bulletin, vol. 30, No. 6, Nov. 1987.

P. A. Appino et al., IBM Technical Disclosure Bulletin, vol. 35, No. 4A, Sep. 1992.

S. P. Thompson, IBM Technical Disclosure Bulletin, vol. 36, No. 06B, Jun. 1993.

METHOD AND SYSTEM FOR SWITCHING BETWEEN USERS IN A CONFERENCE ENABLED APPLICATION

CROSS-REFERENCE TO RELATED APPLICATION

The present application is related to U.S. patent application Ser. No. 08/387,502, entitled *Method For Managing Top-Level Windows Within A Conferencing Network System* (Attorney Docket No. SA9-94-077), U.S. patent application Ser. No. 08/387,501, entitled *Management And Classification of Events For An X Windows Conferencing Enabler* (Attorney Docket No. SA9-94-046), U.S. patent application Ser. No. 08/387,503, entitled *Method For Managing Visual Type Compatibility In A Conferencing Network System Having Heterogeneous Hardware* (Attorney Docket No. SA9-94-121), U.S. patent application Ser. No. 08/387,504, entitled *Method To Support Applications That Allocate Shareable Or Non-Shareable Colorcells In A Conferencing Network System Having A Heterogeneous Hardware Environment* (Attorney Docket No. SA9-94-122), U.S. patent application Ser. No. 08/387,505, entitled *Method For Managing Pixel Selection In A Network Conferencing System* (Attorney Docket No. SA9-94-123), U.S. patent application Ser. No. 08/387,506, entitled *Method And Apparatus For Translating Key Codes Between Servers Over A Conference Networking System* (Attorney Docket No. SA9-94-124), all filed of even date herewith by the inventors hereof and assigned to the assignee herein, and incorporated by reference herein.

BACKGROUND OF THE INVENTION

1. Technical Field

The present invention relates generally to collaborative computing in the form of a computer conference and, particularly, to enabling at least two computer users to collaborate by sharing a single application. Sharing an application means that the application is running on a particular computer and that each computer user who is a conference participant sees the application (user interface, text, graphics, windows, etc) on their particular computer, and each participant may provide input to the application (in the form of keystrokes, mouse, dials, tablets or other input devices) from their particular computer when the application is listening to them, i.e. they have the 'input focus'.

More specifically, the present invention relates to an anarchic method to dynamically switch the input focus in a conference enabled application between designated participants.

2. Description of the Related Art

The AIXPersonal graPHIGS (TM) Programming Interface is an implementation of the PHIGS three dimensional graphics standard. A graPHIGS application can be viewed as having three layers as shown in FIG. 1. The application makes subroutine calls on the graPHIGS shell to perform graphical operations such as creating a window or a graphical object. The graPHIGS shell communicates with the graPHIGS nucleus on behalf of the application. The graPHIGS nucleus manages workstation/graphical resources on behalf of the application. The application and the graPHIGS shell are always in the same execution thread. The graPHIGS shell may connect to a 'private' graPHIGS nucleus in the same execution thread, communicating via subroutine calls. Or, the graPHIGS shell may be connected to a 'remote' graPHIGS nucleus in a separate execution thread, communicating via a network protocol such as GAM or TCP/IP sockets, an example of which is illustrated in FIG. 1. The graPHIGS nucleus may actually reside on the local computer or on a remote computer connected via the network.

A graPHIGS application makes subroutine calls to graPHIGS, known as application program interface (API) calls, to display graphics on the user's workstation. Sharing a graPHIGS application among a set of users on multiple workstation requires that each user on each workstation be able to see and to interact with the same application view. In a conferencing arrangement consisting of two or more participants, each graPHIGS API call is performed on each participants workstation, enabling each user to see the same view of the application. The following is a brief description of a particular method to broadcast graPHIGS API calls to multiple graPHIGS workstations.

A prerequisite to broadcasting the graPHIGS API calls to multiple users is the ability to take a graPHIGS function call made by the application and repeat this function called multiple times, once on each participants computer. GraPHIGS applications use the graPHIGS API, which consists of a collection of subroutines. Each subroutine call collects parameters provided by the application and passes them to a single graPHIGS function of the form:

AFMAIC (AAB, APIcode, APIparms)

where AAB is an application anchor block used to store graPHIGS data structures, APIcode is an integer identifying the current API call, and APIparms is an array of pointers to the API call parameters. Each parameter referred to in APIparms is either an INPUT or OUTPUT parameter; there are no INOUT parameters in the graPHIGS API.

The application anchor block is provided by the application and is initially empty. The anchor block provides a context for the execution of graphics API calls. API calls may change the state of the data structures within the anchor block. Applications may use one or more anchor blocks at a time, providing multiple context for the execution of graPHIGS API calls. The execution of an API call using one anchor block has no effect on any other anchor block.

The graPHIGS API is enabled for conferencing N users through the following steps:

1. Intercepting each graPHIGS API call at the afmaic level.

2. Associating N anchor blocks AAB (1 ... N) with the application's anchor block AAB where each anchor block AAB {i} is associated with user {i}.

3. Invoking afmaic on each AAB {1 ... N}. The effect is to repeat the graPHIGS API call on each user's anchor block, thereby repeating the function call, once for each user.

By enabling the graPHIGS shell to connect to a graPHIGS nucleus on a remote machine, the application may run on machine A while displaying geometry on machine B. By combining this graPHIGS remote nucleus capability with the ability to repeat API calls to multiple users, it is possible to broadcast graPHIGS API calls to the multiple users, each on a separate computer. For example, assuming there are three network users, illustrated in FIG. 2, who each want to share an application, three anchor blocks simulate three complete graPHIGS shells. Each simulated graPHIGS shell is connected to a graPHIGS nucleus on a user's workstation. Any graPHIGS API call invoked by the application is performed on each graPHIGS shell and the effect, if any, of the API call is reflected on the displays of all the remote workstations.

Certain graPHIGS API calls must be performed on all of the simulated graPHIGS shells, while others must be performed on only one shell. Any graPHIGS API call may be classified into one of three categories. The first is broadcast, which includes API calls that must be performed on all shells. Examples include creating a workstation (a window) or drawing a line. The second category is inquiry, which query the state of the graPHIGS shell or nucleus and return the result to the application. Inquiry API calls should be sent to a single privileged graPHIGS shell/nucleus so that a sequence of inquiries return consistent results over time. The third category is input, which includes API calls that return user input to the application. These input API calls must be sent to the graPHIGS shell corresponding to the user who is currently interacting with the application. The user, or more specifically, the graPHIGS shell/nucleus currently interacting with the application is called the 'input focus'. Over time the input focus will change according to an input arbitration mechanism.

This classification of broadcast, inquiry and input API calls ensures that graPHIGS API calls behave properly. Those functions with side effects such as drawing geometry or creating windows are performed on all users' graPHIGS nuclei. Those functions that return input are performed on the user's nucleus that is currently providing input. Those functions that return the result of software or hardware capability are performed on only one machine to ensure consistency.

The preceding does not describe a method of selecting a user to be the input focus, nor does it describe how or when to change the input focus from one user to another. Accordingly, what is needed is a method to dynamically switch the input focus from a participant A to a participant B when both A and B are ready. The switching of the focus must not require intervention by the application, nor may it harm the application with inconsistent input.

SUMMARY OF THE INVENTION

It is therefore one object of the present invention to enhance collaborative computing in a conference mode.

It is another object of the present invention to enable at least two computer users to share the same application in a computer conference and to take turns providing input to the application.

A further object of the present invention is to manage each computer users input to the shared application such that only the participant with the input focus may provide input to the application, input from any other participant is discarded and ignored.

It is yet another object of the present invention to provide an anarchic method to dynamically switch the input focus in a conference enabled application between designated participants.

The foregoing objects are achieved as is now described. According to the present invention, a method of selecting which user has the input focus, and conditions by which a different user will get the input focus in the future is disclosed. A user is said to have the 'floor' if that user is enabled to become the input focus, or in other words, to provide input to the shared application. Zero or more users may have the floor at a particular time. (This is in contrast to a human conference or meeting where generally one person has the floor at a time). A method of selecting the set of users who have the floor is called a floor control policy. The floor control policy determines the set of participants who have the floor now, who will get the floor next, and how and when the floor assignments are made.

An anarchic method of switching the input focus may be used as the basis for implementing a general floor arbitration mechanism, or otherwise called a floor control policy. Using an anarchic method to switch the input focus within the conferencing layer enables floor control policy implementations to be concerned only with determining the set of users enabled to interact with the application and not with the mechanics of actually switching the input focus. The floor control policy can be partitioned into policy and switching layers. The conferencing layer may implement a single switching mechanism to be used by any floor control policy implementation. This enables the floor control policy to be implemented by a component separate from and external to the conferencing layer. Different floor control policies may be used at different times using the same conferencing layer implementation by substituting different floor control policy implementations.

The present invention provides a method to switch the input focus between users who already have the floor. It is not concerned with the problem of determining the set of users who have the floor. The set of users who have the floor is assumed to be defined and managed separately.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 2:
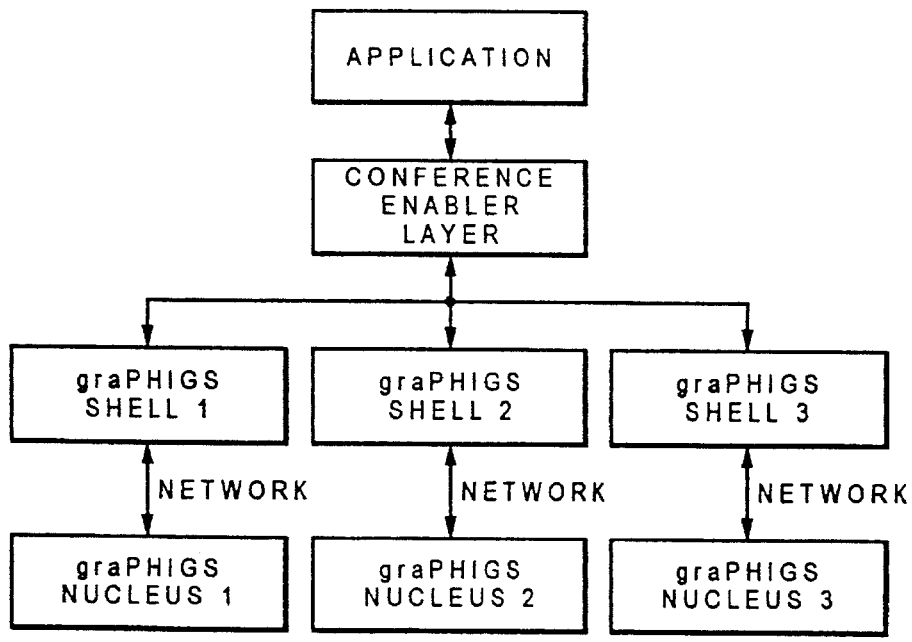
FIG. 2 is a block diagram of multiple users conferencing on the same application as in FIG. 1.

The conferencing layer shown in FIG. 2 implements a method to switch the input focus from participant to participant. The conferencing layer must detect when a participant wants to acquire the input focus, and determine if the input focus may or may not be safely switched between participants. To detect when a participant wants to acquire the input focus, the conferencing layer defines a set of input focus transition triggers. A transition trigger is a user generated action or input event that signals a user's desire to obtain the input focus. The set T of input focus transition triggers used by the graPHIGS conferencing layer is the set of graPHIGS logical input device events, i.e., events from the graPHIGS locator, stroke, evaluator, choice, string and pick logical devices. Other graPHIGS events, e.g., update complete, workstation resize, are not input focus transition triggers. The use of graPHIGS logical input device events as input focus transition triggers enables a participant to request the input focus simply by attempting to interact with the application using one of the input devices.

An example implementation of the 'Trigger' function is shown in Appendix AI.

By definition, a participant has the floor when the participant is enabled to obtain the input focus. This definition enables one or more participants to have the floor at a time, while only one participant actually has the input focus. Having the floor does not imply that a participant has the input focus, only that the participant could obtain the input focus if desired. Also, having the input focus does not imply that a participant has the floor, although a participant must have the floor to obtain the input focus. The anarchic method to switch the input focus from one participant to another, as described above, may be refined to switch the input focus among the set of participants who have the floor. A boolean valued FLOOR attribute is stored for each participant. Floor is TRUE if the participant has the floor, else FLOOR is FALSE. Any participant with FLOOR set to TRUE may obtain the input focus by interacting with the application. Any participant with FLOOR equal to FALSE will be unable to obtain the input focus and any attempts to interact with the application will be ignored.

The FLOOR attribute for each participant is stored in an EvData structure shown in Appendix AI. Each participant has a unique EvData block.

The conferencing layer then defines a set of input focus transition rules that specify the conditions that must be satisfied before the input focus may be safely switched between users. An input focus transition rule is a predicate which returns false if there is a reason why the input focus may not be switched from one participant to another. In general, one or more transition rules may be defined. If any rule returns FALSE, the input focus may not be switched. If all rules return TRUE, the input focus may be switched. The input focus is switched between participants on a first come, first served basis An example implementation of the input focus transitions rules function named 'Rules' is shown in Appendix AI. The set R of input focus transition rules used by the graPHIGS conferencing layer are: First, the input focus may not be switched if the participant triggering the input focus transition does not have the floor. Second, the input focus may not be switched if the current input focus has unprocessed input events. The justification for this rule follows:

When a graPHIGS application has input events on the input focus event queue, switching the input focus might interrupt a potentially significant sequence of input events. The event sequence is significant when the application may reasonably expect to process a set of events that normally occur together. Such a sequence of input events occurs when a graPHIGS application connects a physical device, such as a mouse button, to more than one logical device, such as the locator and pick devices. When a user triggers the physical device, each logical device generates an input event. These input events are marked as graPHIGS 'simultaneous' events. The application may reasonably expect in this mouse button example that a locator event marked as a simultaneous event will be followed or preceded by an associated pick event.

Since the application may reasonably expect to see all the simultaneous events, it is crucial that the graPHIGS conferencing layer not switch the input focus during a sequence of simultaneous events. The input focus transition rules defined above inhibit input focus switching until the input focus event queue is empty, ensuring that sequences of simultaneous events are not interrupted and that applications are not harmed when the input focus is switched.

If an input event occurs on a participant who does not have the input focus, and the input focus is not switched (the event was not a transition trigger or a transition rule failed) then the event is discarded.

Figure 3:
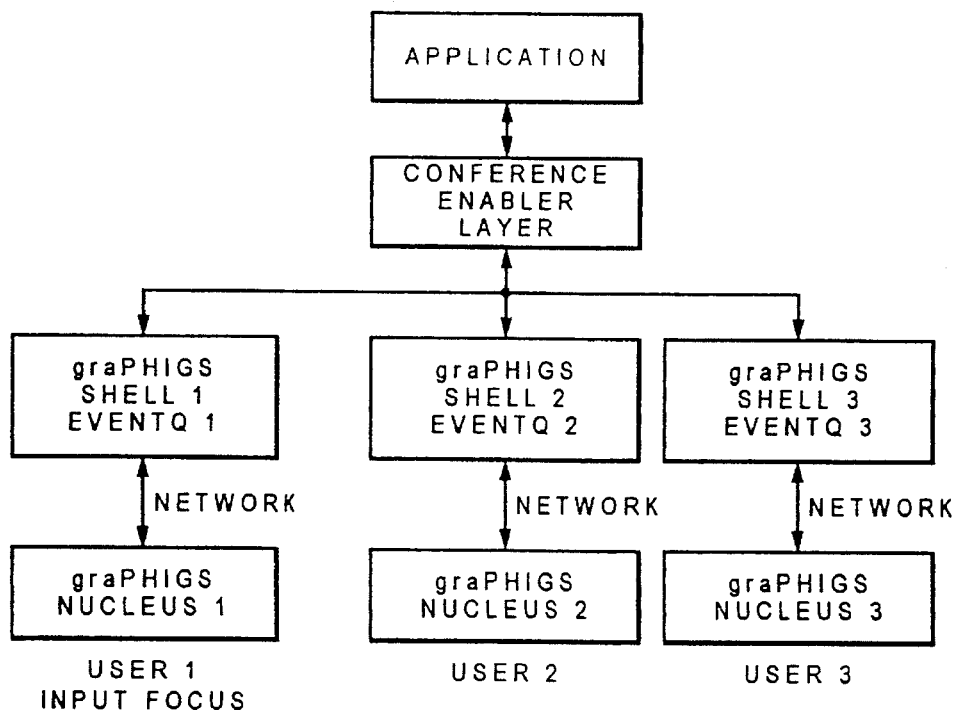
FIG. 3 is a flowchart establishing the hierarchy of control in a conferencing application.

The following is a description of the example implementation of the invention shown in Appendix AI, as implemented on the conferencing system depicted in FIG. 3.

In graPHIGS applications, input events are generated at the graPHIGS nucleus level and sent to the graPHIGS shell where the events are placed on an event queue. Before an event is enqueued, graPHIGS executes an event handler function APP_HANDL( ) supplied by the application. When an event arrives on a participant's shell, graPHIGS invokes APP_HNDL( ) with a set of arguments similar to the following;

void APP_HNDL(void*APP_DATA, int CLASS, bool *ENQ_FLAG, Event*event)

where APP_DATA is a pointer to an application event handler data block supplied by the application when the event handler was installed, a class is an integer identifying the type of the event, ENQ_flag is a boolean flag set by the event handler (TRUE=nqevent FALSE=discard event), and EVENT is a pointer to the event data record.

The graPHIGS API call GPEVHN installs an application's event handler function and a pointer to an application event handler data block. The purpose of the event handler and data block is to enable the application to instruct graPHIGS whether the event should be placed on the event queue or discarded. When an application is enabled for conferencing, each user in the conference has input devices, and a user who is not the input focus may use a device and generate input events.

The conferencing layer uses the graPHIGS event handler capability to discard events from participants who do not have the input focus. The conferencing layer defines its own event handler function EV_HANDL( ) and a set of event handler data blocks EV_DATA[p], one data block per participant.

Figure 4:
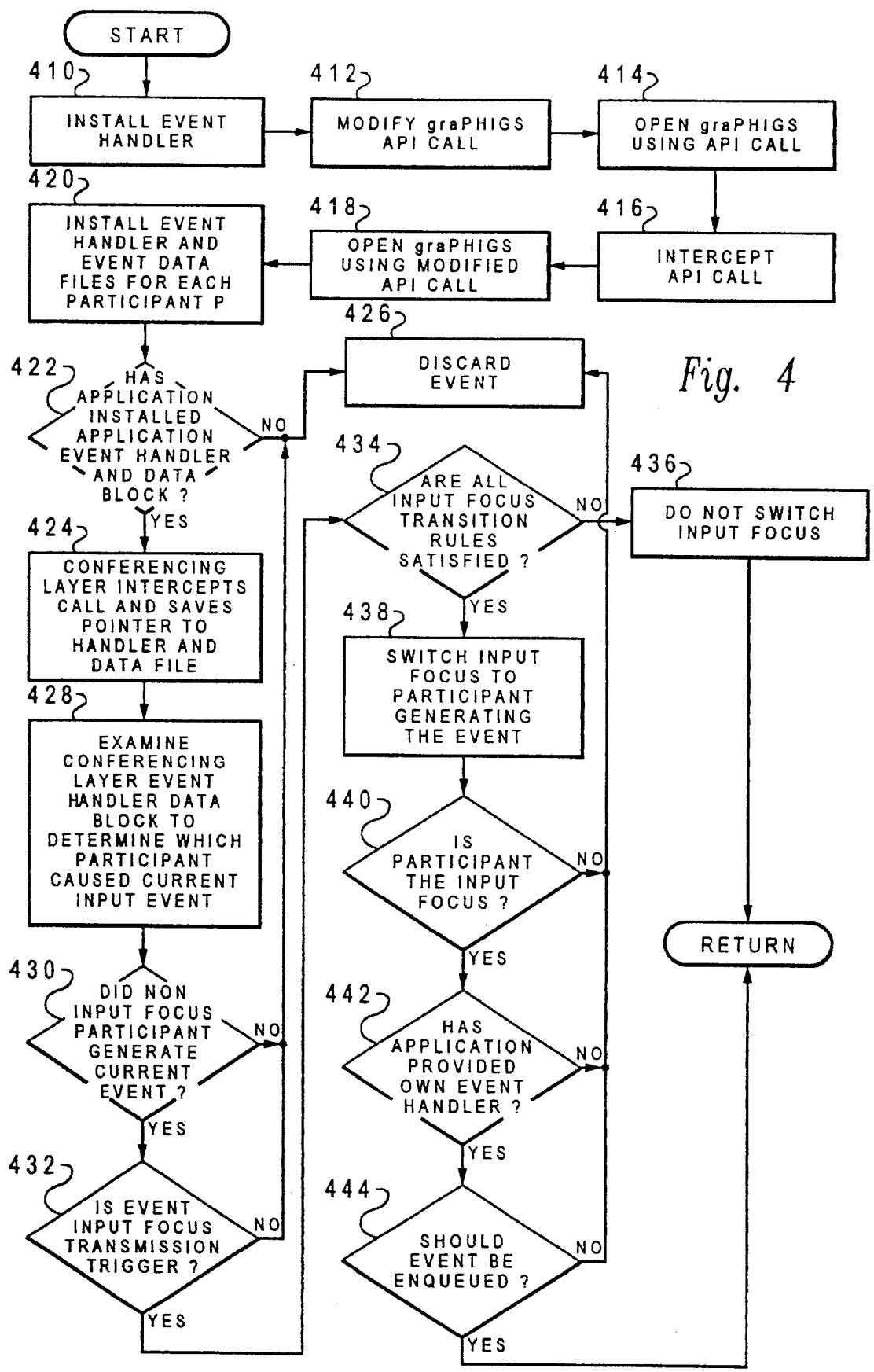
FIG. 4 depicts a flowchart of the system's implementation of the hierarchy established in FIG. 3.

A specific form of the graPHIGS conferencing event handler to support input focus switching using input focus transition triggers and an input focus transition rule is depicted in the flowchart of FIG. 4. Block 410 depicts that the conferencing layer installs its own event handler by modifying the graPHIGs API call GPOPPH(graPHIGS). Next, block 412 shows that the conferencing layer modifies the graPHIGS API call GPOPPH (open graPHIGS). In block 414, when the application opens graPHIGS using GPOPPH, the conferencing layer intercepts the call as shown in block 416, and then opens a unique graPHIGS shell for the participant using the graPHIGS API call GPOPPH, in block 418. Next, in block 420, the application installs the event handler EV_HNDL( ) and the event data block EV_DATA[p] for participant p's graPHIGS shell using GPEVHN. The shells all share the same event handler function, but each participant p has a unique event handler data block EV_DATA[p]. Each data block includes an integer participant identifier with the value P. If and when the application installs its own application event handler APP_HNDL( ) and event handler data block APP_DATA using GPEVHN, as in block 422, the conferencing layer, in block 424, intercepts the call to GPEVHN and saves a pointer to APP_HNDLO( ) and APP_DATA. Examples of the preceding steps, functions and data are illustrated in Appendix AII.

In effect, the preceding steps transform the application into the form illustrated in FIG. 3. The intent is that if an event arrives from the input focus, the conferencing enabler must decide if the event should be enqueued or discarded. If the event comes from a participant that is not the input focus, the event is discarded in block 426. When a participant generates an input event, graPHIGS executes the event handler EV_HNDL( ) with the participants event handler data block EV_DATA[p]. Block 428 depicts that EV_HNDL( ) uses the participant identifier EV_DATA.p to determine which participant caused this input event.

If, in block 430, a non-input focus participant generated the event, EV_HNDL( ) determines, in block 432, if the event is an input focus transition trigger by using the 'Trigger' function illustrated in Appendix AI. If the event is an input focus transition trigger, EV_HNDL( ) determines, in block 434, if all of the input focus transition rules are satisfied by using the 'Rules' function illustrated in Appendix AI. If the event is an input focus transition trigger, and the input focus transition rules are satisfied, the input focus is switched to the participant that generated the input event, otherwise the input focus is not switched, in block 436.

If the participant was or has become the input focus in block 438, and the application has provided its own event handler in block 440, EV_HNDL( ) calls the applications event handler APP_HNDL( ) with the applications event handler data block APP DATA so that the application can decide if the event should be enqueued in block 442 or discarded in block 426

By following the steps outlined above, the conferencing layer handler ensures that each participant's event queue is empty except for the input focus event queue. If a user generates an input event while the user does not have the input focus, and the conferencing layer is unable to switch the input focus to the user, the conferencing layer discards the event, ensuring that the user's input event queue does not overflow.

The method described above solves the problem of dynamically switching the input focus between conference participants in a conference enabled graPHIGS application. The method defines a set of input focus transition triggers, which initiate the process to switch the input focus, a set of input focus transition rules, which determine the circumstances when the input focus may be switched, and a conferencing layer event handler to implement the method. The anarchic method of dynamically switching the input focus also forms the basis for a moderated method of switching the input focus as will now be described.

The preceding method of dynamically switching the input focus between participants is called "anarchic" because of the lack of explicit control over which participant receives the input focus. It is autonomous, requiring no additional user interface capability to communicate with conference participants. In the worst case, users will tug the input focus back and forth between themselves. However confusing this may be to the users, the application is not harmed, i.e, the application is presented with a valid sequence of input events.

The anarchic method of dynamically switching the input focus may be refined into an explicit, or moderated, method to provide a more coherent environment for large conferences.

Two examples of floor control policies are (1) anarchy with view-only participants, and (2) moderated floor control.

Anarchy with view-only participants occurs when one set of interactive participants have the floor, i.e. their FLOOR attribute is TRUE, and the remaining 'view-only' participants do not have the floor, i.e. their FLOOR attribute is FALSE. Interactive participants are enabled to obtain the input focus and interact with the application. View-only participants are not enabled to obtain the input focus and may not interact with the application.

Participants join a conference as either interactive or view-only participants. View-only participants may only view what the interactive participants are doing. A view-only participant may be appropriate when training new employees on live data or whenever a participant should be able to see but not change data.

Moderated floor control may be used to explicitly transfer control of the application from one participant A to participant B with or without an explicit action by either participant. The 'moderator' (a privileged user for example) makes participant B a view-only participant and makes participant A an interactive participant (an object of moderated floor control is that only one participant should have the floor at a time). The input focus remains with participant A and the application will continue to process input from participant A until participant B is granted the right to interact with the application and A becomes the view-only participant. This ensures consistent input to the shared application with explicit transfer of control.

The implementation of a floor control policy does not itself switch the input focus, but rather, it determines the set of participants who may obtain the input focus. Similarly, anarchic input focus switching does not determine the set of participants who may obtain the input focus, but rather it gives the input focus to only those participants who have the floor. Implementing a floor control policy on top of anarchic input focus switching consists of defining the set of participants who have the floor at a point in time to the conference layer. An implementation of a floor control policy sets the FLOOR attribute on the participant indicating whether or not he participant has the floor. An example of a conference enabled graPHIGS application with FLOOR attributes is shown in FIG. 5.

Figure 1:
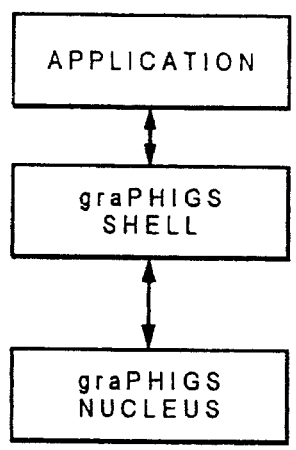
FIG. 1 depicts is a prior art block diagram of the interaction of the application, a shell, and a nucleus.
Figure 6:
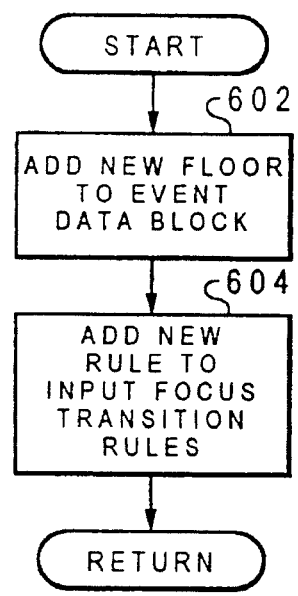
FIG. 6 depicts a flowchart adding a new floor attribute to participants in the system according to FIG. 5.
Figure 5:
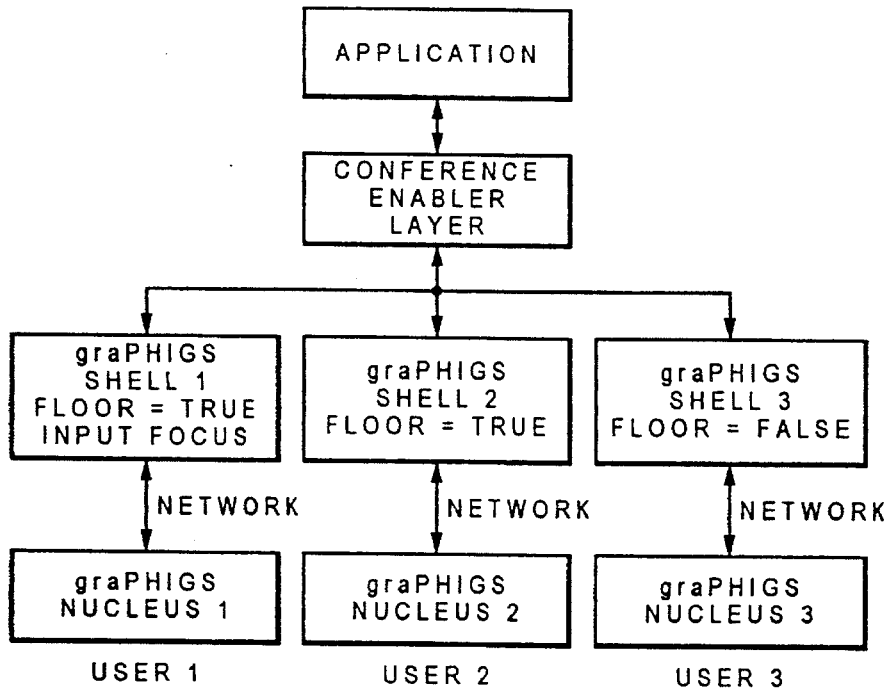
FIG. 5 is a block diagram of multiple users according to the present invention.

In FIG. 5, participants or users one and two have the floor and participant or user three does not. Participant one also has the input focus. When participant two interacts with the application, anarchic input focus switching would attempt to switch the input focus to participant two. If participant three attempts to interact with the application, anarchic input focus switching, as modified below, would determine that participant three does not have the floor and the interaction would be ignored. The graPHIGS conference event handler for FIG. 5 is the same as that shown in FIG. 3. The enhanced event handler gives the input focus only to those participants who have the floor. The event handler is modified, in FIG. 6, by adding a new floor FLOOR attribute to the participants event data block EV_DATA in block 610, and, in block 612, by adding a new rule to the input focus transition rule RULES( ), which returns FALSE if a participants FLOOR attribute is set to FALSE.

While the invention has been particularly shown and described with reference to a preferred embodiment, it will be understood by those skilled in the art that various changes in form and detail may be made therein without departing from the spirit and scope of the invention.

APPENDIX AI

```
/* conferencing layer event handler data block structure         */
typedef struct {
    int p;       /* participant's identifier                     */
    boolean FLOOR; /* Does participant have the floor?           */
{ EvData;
/*graPHIGS event data */
typedef struct {
    int type;
    char data[1];
} Event;
/* the integer identifier of the input focus participant         */
int InputFocus;
/* pointer to the application's event handler function           */
void (*APP_HNDL) ( ) = NULL;
*/ pointer to the application's event handler data block        */
void *APP_DATA = NULL;
/*
 * input focus transition trigger predicate
 * returns TRUE if the event is a trigger, else FALSE
 */
bool Trigger(EvData *EV_DATA, Event *EVENT)
{
   switch(EVENT->type) {
      case Locator:
      case Stroke:
      case Valuator:
      case Choice:
      case String:
      case Pick:
            return TRUE;
   }
   return FALSE
}
/*
 * input focus transition rule predicate
 * FALSE if the input focus event is not empty
 * FALSE if the participant does not have the floor
 * otherwise, TRUE.
 */
bool Rules(EvData *EV_DATA, Event *EVENT)
{
    /* ensure consistent input, verify the event queue is empty */
    if InputFocus event queue is not empty
         return FALSE;
    /* event queue is empty. Does this participant also have the floor?
    if EV_DATA->FOCUS is FALSE
         return FALSE;
    return TRUE;
}
```

APPENDIX II

```
/* the conferencing layer's event handler function               */
void EV_HNDL(EvData *EV_DATA, int CLASS, bool *ENQ_FLAG,
     Event *EVENT)
{
    /* did the event come from the input focus?                  */
    if (EV_DATA->p == InputFocus)
        /*
         * input focus event
         * tentatively mark event to be enqueued
         */
        *ENQ_FLAG = TRUE;
    else
        /*
         * non input focus event
         * if event is an input focus transition trigger and
         * all input focus transition rules are satisfied,
         * switch the input focus.
         */
        if (Trigger (EV_DATA, EVENT) && Rules(EV_DATA, EVENT)) {
              *ENQ_FLAG = TRUE;
              InputFocus = EV_DATA->p;
        }
        else
              ENQ_FLAG = FALSE;
/*
 * If *ENQ-FLAG == TRUE, then either the event occurred
 * on the input focus, or the input focus has been switched.
 *
 * if an application event handler is defined,
 * the application event handler should decide if
 * event should be enqueued.
 * if no application event handler is defined,
 * the event is enqueued.
 */
if (*ENQ_FLAG == TRUE)
   if (APP_HNDL == NULL)
      /* application event handler is not defined, enqueue event                                                         */
       *ENQ_FLAG = TRUE;
   else
      /*
       * application event handler is defined, the application
       * will decide if the event should be enqueued or discarded
       */
      APP_HNDL(APP_DATA, CLASS, ENQ_FLAG, EVENT);
}
```

What is claimed is:

1. A method of switching input control between conferencing participants operating in a collaborative computer-based system having a plurality of display devices for the display of a public conference view of data object amongst said participants and using an event handler for controlling the input of shared data objects amongst said participants, the method comprising the steps performed by a computer of:

defining a set of participant control transition triggers that indicate when a participant desires input control of said system within said event handler;

defining a set of participant control transition rules that establish which participant has control, which participant can obtain control as an active participant, and which participant cannot gain control as a non-active participant, amongst said conferencing participants;

integrating both sets of said participant control transition triggers and rules to form an enhanced conferencing level event handler for switching input control from a first active participant to a second active participant based on an input event from said second active participant while disregarding input events from nonactive participants.

2. The method according to claim 1 wherein said defined set of participant control transition triggers include logical input device events selected from the group comprising locator, stroke, evaluator, choice, string and pick.

3. The method according to claim 1 wherein said defined set of participant control transition rules includes the step of:

determining if said event handler is not empty;

granting said participant control of said editing system if said event handler is empty.

4. The method according to claim 1 wherein said defined set of participant control transition rules comprises the steps of:

determining if said event handler is not empty;

determining if said participant cannot gain control amongst said conferencing participants as a non-active participant; and granting said participant control of said editing system if said event handler is empty and if said participant can gain control as an active participant.

5. An event handler for controlling a computer conferencing system for conferencing an application, which computer conferencing system includes a plurality of networked computer terminals with displays sharing the same view during conferencing and each said networked computer terminal having associated therewith an application shell, which interacts with said event handler, and an application nucleus, which interacts with said application shell and a conferencing participant using said networked computer terminal, comprising:

means for modifying a call function within said application thereby enabling said event handler to intercept and use any calls issued between said application and each participant;

means for defining a participant event handler data block for each participant, which participant event handler data block allows each participant to interact with said application;

means for defining an input focus pointer, which assigns exclusive control of said conferenced application to a designated participant who is an active participant;

means for transferring control of said conferenced application to another participant based on calls sent by said other participant to said data block while ignoring calls from any participant determined to be a non-active participant wherein any participant may view the conferenced application but only active participants can gain control of said input focus.

6. The event handler according to claim 5 wherein said transferring means further comprises:

means for determining which participant sent input data, thereby requesting control of said conferenced application;

means for determining if said participant sending said input data requesting control of said conferenced application can receive control of said conferenced and discarding said call if said participant sending said call cannot receive control; and means for enqueueing said input data requesting control for execution by said conferenced application.

* * * * *

UNITED STATES PATENT AND TRADEMARK OFFICE
CERTIFICATE OF CORRECTION

PATENT NO. : 5,557,725
DATED : September 17, 1996
INVENTOR(S) : Ansberry et al.

It is certified that error appears in the above-indentified patent and that said Letters Patent is hereby corrected as shown below:

Column 7, line 32: insert --_-- before "DATA"

Signed and Sealed this

Third Day of December, 1996

Attest:

BRUCE LEHMAN

*Attesting Officer*     *Commissioner of Patents and Trademarks*